US010993117B2

(12) United States Patent
Pu et al.

(10) Patent No.: US 10,993,117 B2
(45) Date of Patent: Apr. 27, 2021

(54) UNLICENSED BAND MANAGEMENT CONTROL INDICATORS

(71) Applicant: APPLE INC., Cupertino, CA (US)

(72) Inventors: Tianyan Pu, Cupertino, CA (US); Farouk Belghoul, Campbell, CA (US); Wei Zeng, San Diego, CA (US); Wei Zhang, Santa Clara, CA (US); Xiaowen Wang, Cupertino, CA (US); Yang Li, Plano, TX (US); Ping Wang, San Jose, CA (US); Haitong Sun, Cupertino, CA (US); Beibei Wang, Cupertino, CA (US); Yuchul Kim, San Jose, CA (US); Johnson O. Sebeni, Fremont, CA (US); Dawei Zhang, Saratoga, CA (US); Sami M. Almalfouh, San Jose, CA (US); Zhu Ji, San Jose, CA (US); Sunny Arora, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/214,472

(22) Filed: Dec. 10, 2018

(65) Prior Publication Data

US 2019/0182675 A1 Jun. 13, 2019

Related U.S. Application Data

(60) Provisional application No. 62/598,221, filed on Dec. 13, 2017.

(51) Int. Cl.
*H04W 16/14* (2009.01)
*H04W 24/10* (2009.01)
(Continued)

(52) U.S. Cl.
CPC .......... *H04W 16/14* (2013.01); *H04W 24/08* (2013.01); *H04W 24/10* (2013.01); *H04W 48/12* (2013.01);
(Continued)

(58) Field of Classification Search
CPC ..... H04W 48/12; H04W 24/08; H04W 24/10; H04W 72/0453; H04W 72/042; H04W 16/14; H04L 5/0091
See application file for complete search history.

(56) References Cited

U.S. PATENT DOCUMENTS

10,594,468 B2 * 3/2020 Liao .................. H04L 5/0007
2012/0230267 A1 * 9/2012 Sundaresan .......... H04W 72/06 370/329
(Continued)

*Primary Examiner* — Redentor Pasia
(74) *Attorney, Agent, or Firm* — Fay Kaplun & Marcin, LLP (57) ABSTRACT

An evolved Node B (eNB) serves as a primary serving cell (PCell) providing a primary component carrier (PCC) in a licensed spectrum to a user equipment (UE) in a carrier aggregation (CA) scheme. A secondary component carrier (SCC) is provided in an unlicensed spectrum. The eNB monitors parameters of bandwidths in the unlicensed spectrum, when at least one of the parameters indicates a change in availability of a select one of the bandwidths, the eNB generates a control indicator defining the change in availability of the bandwidth and broadcasts the control indicator to the UE, wherein the control indicator affects a modification in a transceiver of the UE associated with the bandwidth.

20 Claims, 6 Drawing Sheets

(51) Int. Cl.
   *H04W 72/04*     (2009.01)
   *H04W 24/08*     (2009.01)
   *H04W 48/12*     (2009.01)
   *H04W 74/08*     (2009.01)
   *H04W 48/16*     (2009.01)

(52) U.S. Cl.
   CPC ..... *H04W 72/042* (2013.01); *H04W 72/0453* (2013.01); *H04W 48/16* (2013.01); *H04W 74/0808* (2013.01)

(56) References Cited

U.S. PATENT DOCUMENTS

| | | | |
|---|---|---|---|
| 2013/0114571 A1* | 5/2013 | Das | H04W 24/10 370/336 |
| 2015/0063143 A1* | 3/2015 | Toskala | H04W 48/20 370/252 |
| 2015/0327103 A1* | 11/2015 | Tang | H04W 24/10 370/252 |
| 2016/0029248 A1* | 1/2016 | Syed | H04W 28/08 370/235 |
| 2016/0255611 A1* | 9/2016 | Damnjanovic | H04L 27/0006 370/330 |
| 2019/0082431 A1* | 3/2019 | Yi | H04W 72/0446 |
| 2019/0289513 A1* | 9/2019 | Jeon | H04W 52/40 |

* cited by examiner

UNLICENSED BAND MANAGEMENT CONTROL INDICATORS

PRIORITY/INCORPORATION BY REFERENCE

This application claims priority to U.S. Provisional Application 62/598,221 entitled "Unlicensed Band Management Control Indicators," filed on Dec. 13, 2017, the entirety of which is incorporated herein by reference.

BACKGROUND INFORMATION

A user equipment (UE) may be configured with a variety of different capabilities. For example, the UE may be capable of establishing a connection with a network. In one example, the UE may connect to a Long Term Evolution (LTE) network. While connected to the LTE network, the UE may utilize capabilities associated with the LTE network. For example, the UE may utilize a carrier aggregation (CA) functionality in which a primary component carrier (PCC) and at least one secondary component carrier (SCC) are used to communicate data over the various LTE bands. The network component to which the UE has connected may be an evolved Node B (eNB) that provides the PCC. The connected eNB may also control how the carrier aggregation is to be utilized with the SCCs. For example, the eNB may request measurements for LTE bands which are associated with the SCCs and receive the measurements to determine how the available bands are to be used in the carrier aggregation functionality. Thus, the UE may have a plurality of LTE bands or carriers that are available to communicate data.

In one type of the CA functionality, the SCC may be provided through bandwidths in the unlicensed spectrum. In the LTE standards, a Licensed Assisted Access (LAA) may be a modification to the CA functionality that allows unlicensed bandwidths to be used for the SCC. In contrast to using licensed bandwidths for the SCC, use of unlicensed bandwidths introduces interference or other sources of performance degradation from other wireless technologies as the spectrum including these unlicensed bandwidths are being shared with these other wireless technologies (e.g., WiFi). Without a mechanism in place to resolve use of unlicensed bandwidths by the primary serving cell providing the PCC, the LAA may require additional time and/or power from the UE. For example, the primary serving cell may select an unlicensed bandwidth for use by the UE. However, the UE may return information indicating that the selected unlicensed bandwidth is not viable for the SCC through various measurements and/or process failures. Accordingly, the UE must use additional power for these measurements/processes and the use of the unlicensed bandwidths requires further time to properly configure.

SUMMARY

In an exemplary embodiment, a method is performed by an evolved Node B (eNB) serving as a primary serving cell (PCell) providing a primary component carrier (PCC) in a licensed spectrum to a user equipment (UE) in a carrier aggregation (CA) scheme, wherein a secondary component carrier (SCC) is provided in an unlicensed spectrum. The method includes monitoring parameters of bandwidths in the unlicensed spectrum, when at least one of the parameters indicates a change in availability of a select one of the bandwidths, generating a control indicator defining the change in availability of the bandwidth and broadcasting the control indicator to the UE, wherein the control indicator affects a modification in a transceiver of the UE associated with the bandwidth.

In a further exemplary embodiment, a network component having a transceiver and a processor is described. The transceiver is configured to connect to a user equipment (UE), the transceiver configured with a carrier aggregation (CA) functionality and serving as a primary serving cell (PCell) providing a primary component carrier (PCC) to the UE, wherein a secondary component carrier (SCC) is provided in an unlicensed spectrum. The processor monitors parameters of bandwidths in the unlicensed spectrum, when at least one of the parameters indicates a change in availability of a select one of the bandwidths, the processor generates a control indicator defining the change in availability of the bandwidth, wherein the processor instructs the transceiver to broadcast the control indicator to the UE, wherein the control indicator affects a modification in a transceiver of the UE associated with the bandwidth.

In a still further exemplary embodiment, a method is performed by a user equipment (UE) configured with a carrier aggregation (CA) functionality and a licensed assisted access (LAA) functionality wherein a primary component carrier (PCC) is served in a licensed spectrum and a secondary component carrier (SCC) is served in an unlicensed spectrum, the UE being provided control information to use the LAA functionality by a primary serving cell (PCell) providing the PCC. The method includes receiving a control indicator being broadcast from the PCell, the control indicator defining a change in an availability of a bandwidth in the unlicensed spectrum, determining a modification to a transceiver of the UE associated with the bandwidth and implementing the modification.

DETAILED DESCRIPTION

The exemplary embodiments may be further understood with reference to the following description and the related appended drawings, wherein like elements are provided with the same reference numerals. The exemplary embodiments are related to a device, system, and method for managing an unlicensed spectrum of bandwidths used in a Licensed Assisted Access (LAA) functionality which is a particular manner of using a carrier aggregation (CA) functionality. For example, one or more user equipments (UEs) may be connected to a Long Term Evolution (LTE) network in which the UEs are CA capable and the LTE network is configured with the CA functionality where the CA functionality may include a primary serving cell (PCell) providing a primary component carrier (PCC) and at least one secondary serving cell (SCell) respectively providing a secondary component carrier (SCC). The exemplary embodiments provide a mechanism where the UEs may utilize the unlicensed spectrum for one or more SCCs and the PCell is configured to manage the use of the unlicensed spectrum.

The exemplary embodiments are described with regard to carrier aggregation performed on an LTE network and using an unlicensed spectrum relative to the LTE network via the LAA functionality. However, the use of the LTE network and the LAA functionality are only exemplary. The exemplary embodiments may be modified and/or used with any network that supports carrier aggregation or a substantially similar functionality in which a plurality of component carriers is used as well as any functionality that utilizes bandwidths outside a designated or licensed spectrum. For example, it is expected that the next generation of cellular networks (e.g., 5G networks) will support functionalities similar to CA and LAA and the exemplary embodiments may be used with such a network.

As will be described in further detail below, the exemplary embodiments may utilize downlink control information (DCI) generated by the PCell and provided to the UEs. Those skilled in the art will understand that the DCI may be a feature associated with the LTE network. However, as described above, features associated with the LTE network such as the DCI are only exemplary. The exemplary embodiments may utilize any control mechanism that has the characteristics as described herein to provide the features of the DCI in managing the unlicensed spectrum.

The exemplary embodiments relate to configurations where the UE may associate with a network component which serves as the PCell. In an LTE network, the network component may be an evolved Node B (eNB). The PCell may control how data is exchanged with the UE, such as, how the PCC and any SCCs are to be used in the CA functionality including using an unlicensed spectrum for the SCCs when LAA is implemented. When the UE is CA capable, the CA functionality enables the PCell and a further SCell to combine bandwidths to exchange data with the UE to increase a rate of data exchange. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwidth, a second Scell may provide a third portion of the total bandwidth, and so on.

Using the LAA functionality, at least one SCell may provide a component bandwidth from an unlicensed spectrum. The PCell may operate on a licensed spectrum as defined by standards of the LTE network. Thus, in the licensed spectrum, the PCell may utilize a particular bandwidth (referred to herein as a "licensed bandwidth" or "licensed channel"). With the LAA functionality, the PCell may provide the PCC as a licensed "anchor" to the CA functionality. The LAA functionality allows for the SCell to operate on an unlicensed spectrum which comprises any bandwidth falling outside the licensed spectrum. Thus, in the unlicensed spectrum, the SCell may utilize a particular bandwidth (referred to herein as an "unlicensed bandwidth" or "unlicensed channel," either term being used herein to represent either or both).

For illustrative purposes, the exemplary embodiments are described with using the unlicensed spectrum associated with a WiFi network. Specifically, the 5 GHz spectrum of WiFi networks may be used by the SCell. However, the spectrum of the WiFi network and the 5 GHz spectrum of the WiFi network are only exemplary. The exemplary embodiments may utilize any unlicensed spectrum as well as any unlicensed bandwidth that falls outside the licensed spectrum.

Although the LAA functionality may provide an increased bandwidth available for data exchange, the SCell using the unlicensed spectrum shares the physical medium with any other wireless technology that uses bandwidths in the unlicensed spectrum. In view of this overlap in using a common physical medium, the LAA functionality may include a listen before talk (LBT) mechanism. Those skilled in the art will understand that the LBT mechanism is a contention protocol for the medium so that the LAA functionality is capable of being used while coexisting with other devices using the unlicensed spectrum. The LBT mechanism may involve sensing a radio environment prior to initiating a transmission to determine a network or bandwidth over which a data exchange may be performed. For example, by monitoring selected channels, the LBT mechanism provides information for a data exchange to be performed when a channel is not in use or overloaded.

In view of the LAA functionality using the LBT mechanism, the LAA functionality exhibits a dynamic on/off behavior. Furthermore, appropriate unlicensed band selection/re-selection is used for performance and coexistence. For example, the channel re-selection operation may be carried out during normal small cell operations (e.g., after the initialization of a small cell). The channel re-selection operation may also be based on periodical channel measurements and/or events (e.g., a WiFi access point (AP) joins the unlicensed bandwidth). However, the PCell is configured to use a reactive procedure to manage the use of the unlicensed spectrum. Accordingly, the UE using an unlicensed bandwidth may be forced to use additional power and time to eventually use a viable unlicensed bandwidth.

The exemplary embodiments are configured to provide a proactive mechanism where the PCell manages the unlicensed spectrum and SCCs including those using unlicensed bandwidths to UEs that improve an overall efficiency of using the LAA functionality. For example, the PCell may configure one or more unlicensed bandwidths for a LAA capable UE to define how a receiver of the UE is used in both activation and deactivation as well as how the UE performs a channel selection/re-selection of a channel or a portion thereof via a bandwidth part (BWP). The exemplary embodiments may also be utilized such that a SCell is configured to manage the unlicensed spectrum for the UE. Accordingly, the operations according to the exemplary embodiments may be represented as eNB procedures for the implementation associated with LTE. However, for illustrative purposes, the exemplary embodiments are described herein with regard to the PCell. As will be described in further detail below, the exemplary embodiments allocate a dedicated control resource set (CORESET) in the licensed spectrum through the PCell to manage use of the unlicensed spectrum. Thus, once a UE is configured for the LAA functionality and LAA SCells are activated, the UE monitors the CORESET for LAA downlink control. The exemplary embodiments may also be utilized to define the CORESET in an unlicensed band. Thus, the CORESET may be utilized in any available physical medium. However, for illustrative purposes, the exemplary embodiments are described with regard to the CORESET being defined in the licensed band. The dedicated CORESET may include a plurality of different dedicated carrier-specific downlink (DL) control information (DCI). Being carrier specific (and not UE specific), the DCIs inside the dedicated CORESET may be broadcast to every UE configured with the LAA functionality. The DCIs are also designed as a status update from the PCell such that the UEs may leverage the information in the DCI for power and synchronization purposes. Examples of dedicated carrier-specific DCIs may include a carrier off DCI, a carrier on DCI, a channel re-selection DCI, and a carrier BWP DCI. The carrier off DCI may define when a receiver or portions thereof are deactivated or placed to sleep. The carrier on DCI may define when a receiver or portions thereof are activated or placed awake. The channel re-selection DCI may define how a channel is re-selected when a current channel falls below an operating threshold to synchronize the UE for channel hopping. The carrier BWP DCI may further define how a channel is re-selected through BWPs that are to be omitted from consideration. Each of these exemplary DCIs will be described in greater detail below.

Figure 1:
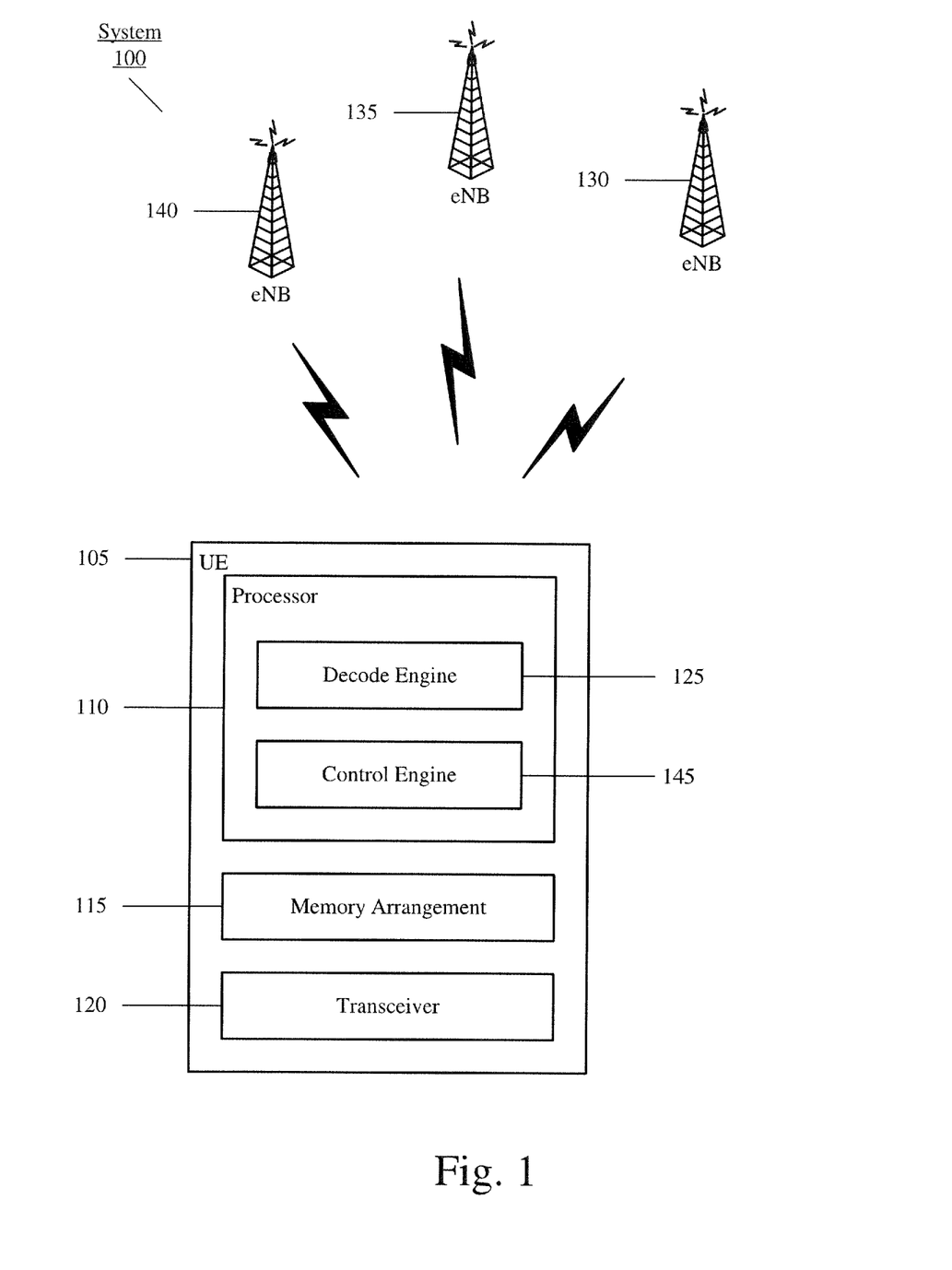
FIG. 1 shows an example system managing unlicensed bandwidths for carrier aggregation according to various exemplary embodiments described herein.

FIG. 1 shows an example system 100 managing unlicensed bandwidths for CA according to various exemplary embodiments described herein. In the system 100, a UE 105 may be capable of using the CA functionality and may further be capable of using the LAA functionality. The system 100 includes the UE 105 and a plurality of eNBs 130, 135, 140. As discussed above, the UE 105 may associate with one of the eNBs 130-140 such as the eNB 130 to join the network corresponding to the eNB 130 such as an LTE network. The UE 105 and the eNBs 130-140 may also include the CA functionality and the LAA functionality that may be enabled and controlled by the eNB 130. As the UE 105 is associated with the eNB 130, the eNB 130 may provide the CA and LAA configuration for component carriers to be used by the UE 105 in which the eNB 130 may be the PCell and the eNBs 135, 140 may serve as the SCells in which one or more of the eNBs 135, 140 use an unlicensed bandwidth for the corresponding SCC. Accordingly, it may be assumed that the eNBs 135, 140 are within an operational range to provide SCCs corresponding to the SCells (e.g., eNBs 135, 140). It is noted that the eNBs 130-140 being an eNB is only exemplary. The eNBs 130-140 may also be other types of access nodes for the network (e.g., gNB, a small cell, etc.). However, for illustrative purposes, the access node is described with regard to eNBs.

The UE 105 may be any electronic device configured to join a network via the eNB 130. For example, the UE 105 may be a portable device such as a cellular phone, a smartphone, a tablet, a phablet, a laptop, a wearable, an Internet of Things (IoT) device, etc. In another example, the UE 105 may be a stationary device such as a desktop terminal. The UE 105 may also operate on a variety of different frequencies or channels (i.e., range of continuous frequencies). Accordingly, the UE 105 may include components that enable different radio access technologies or capability of using a spectrum (e.g., bandwidth, channel, etc.) associated with these radio access technologies. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. The data may be exchanged using the LAA functionality to increase a rate in which the data is exchanged in the downlink. The LAA functionality or may also be used to increase a data rate exchange in the uplink. In another example, the applications may include a decode engine 125 that is configured to monitor a CORESET. As will be described in further detail below, the decode engine 125 may receive a DCI from the PCell and determine the manner in which the unlicensed spectrum is being managed for the LAA functionality. In a further example, the applications may include a control engine 145 that is configured to implement the defined manner of using the LAA functionality based on an output from the decode engine 125. The operations of the UE 105 in managing the unlicensed spectrum will be described in further detail below.

The above noted engines being an application (e.g., a program) executed by the processor 110 is only exemplary. The engines may also be represented as components of one or more multifunctional programs, a separate incorporated component of the UE 105 or may be a modular component coupled to the UE 105, e.g., an integrated circuit with or without firmware. In addition, in some UEs, the functionality described for the processor 110 is split among two processors, a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store measurements associated with different component carriers used by the UE 105 in a CA functionality.

Using the CA functionality, the eNB 130 may serve as the PCell while the eNBs 135, 140 may serve as at least one of the SCells. Accordingly, when configured and activated, the SCells may be, for example, small cells that operate in the unlicensed spectrum. The PCell may provide a first component carrier (e.g., 10 MHz) representing the PCC operating on a first licensed band (e.g., of the LTE network) while the SCell may provide a second component carrier (e.g., 20 MHz) representing the SCC operating on an unlicensed band (e.g., the 5 GHz band). Those skilled in the art will understand that other bandwidths may be used such as 1.4, 3, 5, or 15 MHz and typically a maximum of five component carriers may be aggregated. In the present example, with the PCC having a bandwidth of 10 MHz and the SCC having a bandwidth of 20 MHz, carrier aggregation may combine the bandwidths for a total bandwidth of 30 MHz.

The network shown in the system 100 is only exemplary. For example, the number of eNBs 130-140 that may be in communicative range of the UE 105 may be more or fewer them three. Those skilled in the art will also understand that there may be any number of other types of networks that may also be in communicative range of the UE 105 and that the UE 105 may also be configured to establish connections therewith. That is, the UE 105 may also connect using different radio access technologies (RATs). For example, the system 100 may further include a legacy radio access network, a wireless local area network, a WiFi network, a Bluetooth connection, etc. If configured for such a capability, the CA functionality may even be used between other types of networks. However, for exemplary purposes, the CA functionality is described herein with regard to the LTE network and the component carriers being provided by the eNBs 130-140. Also, as noted above, the eNBs 130-140 may be configured with the LAA functionality and configured as small cells. Accordingly, the eNBs 130-140 may include any necessary hardware, software, and/or firmware to utilize the unlicensed spectrum. Thus, the eNBs 130-140 operating as a SCell may be an eNB modified to operate in the unlicensed spectrum (e.g., a small cell, a femtocell, a picocell, a microcell, etc.). Thus, the eNBs 130-140 may be any type of base station that may communicate with the UE 105 in the unlicensed spectrum.

Those skilled in the art will understand that the LAA functionality only provides a potential of increased transmission efficiency. For example, the UE 105 may only realize the maximum increased transmission efficiency when conditions permit. For example, a selected SCell using a selected unlicensed bandwidth may experience interference and not be capable of providing an expected throughput.

The exemplary embodiments are configured to enhance the LAA functionality through a proactive mechanism used by the PCell. The PCell may perform a plurality of different operations to manage the unlicensed spectrum. In performing these operations, the PCell may generate a corresponding DCI and transmit/broadcast the DCI to the UE 105 (as well as any other LAA capable UE in the system 100). Using these operations, the PCell may increase a probability that the LAA functionality provides the increased transmission efficiency.

Figure 2:
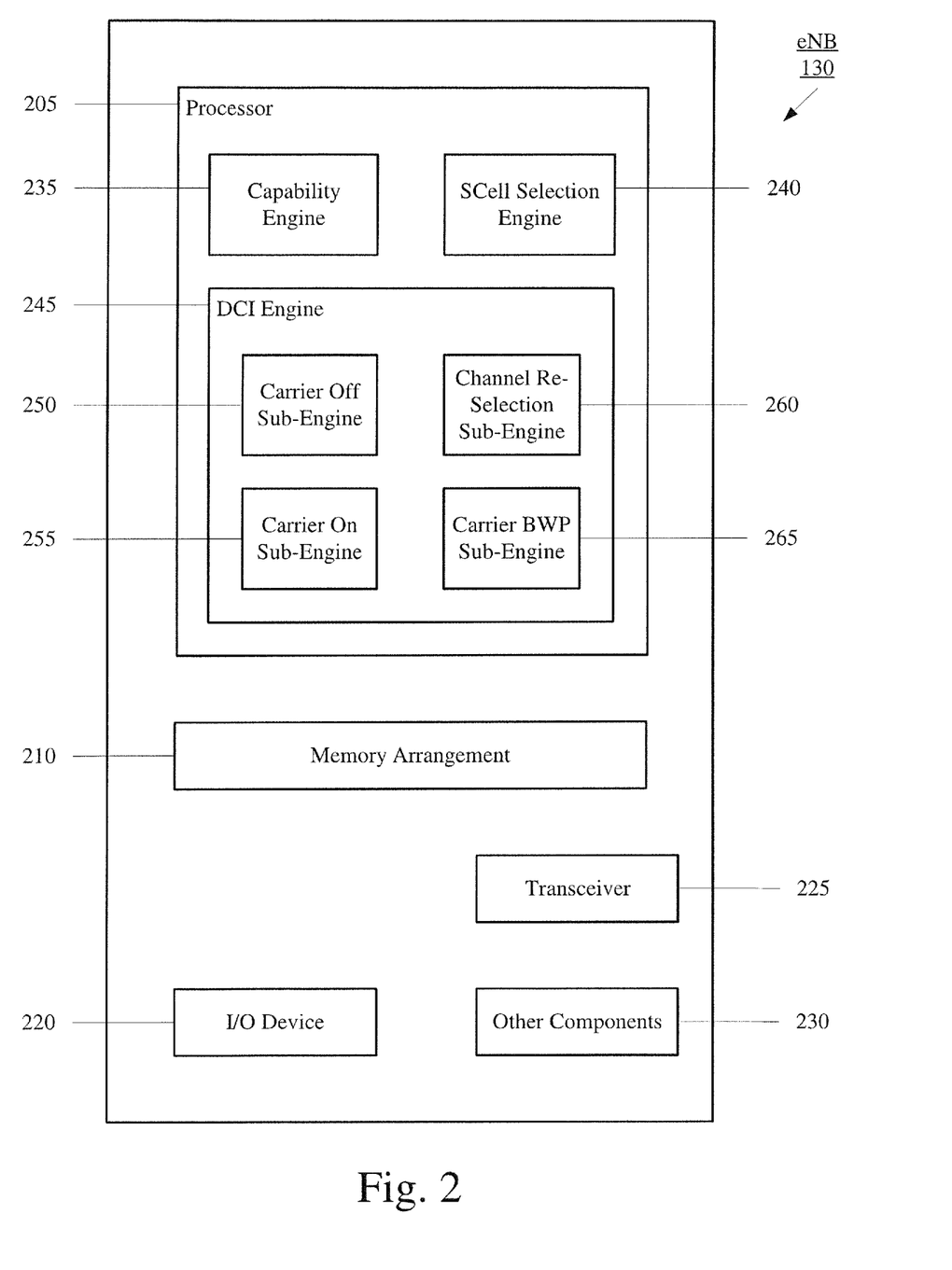
FIG. 2 shows an example primary serving cell of the system of FIG. 1 configured to manage unlicensed bandwidths according to various exemplary embodiments described herein.

FIG. 2 shows an example PCell of the system 100 of FIG. 1 configured to manage unlicensed bandwidths according to various exemplary embodiments described herein. In this example, the PCell may be the eNB 130. Thus, for illustrative purposes, it may be assumed that the eNB 130 operates in the licensed spectrum to provide the PCC and communicate with the UE 105. However, the use of the eNB 130 as the PCell is only exemplary and any of the eNBs 130-140 may be the PCell while the other eNBs 130-140 may be SCells.

The eNB 130 may be configured to execute a plurality of engines that perform functionalities to proactively manage the unlicensed spectrum for use in the LAA functionality by the UE 105. The eNB 130 may represent any access node of the LTE network through which the UE 105 may establish a connection and manage network operations. Again, the eNB 130 may be representative of the other eNBs 135, 140 if these eNBs 135, 140 perform the functionalities of the PCell. The eNB 130 may include a processor 205, a memory arrangement 210, an input/output (I/O) device 220, a transceiver 225, and other components 230. The other components 230 may include, for example, an audio input device, an audio output device, a battery, a data acquisition device, ports to electrically connect the eNB 130 to other electronic devices, etc.

The processor 205 may be configured to execute a plurality of engines of the eNB 130. For example, the engines may include a capability engine 235, a SCell selection engine 240, and a DCI engine 245. As will be described in further detail below, the capability engine 235 may be configured to process the CA and LAA functionalities of UEs for which the eNB 130 serves as the PCell. The SCell selection engine 240 may be configured to operate with the capability engine 235 to determine how SCells are selected and used in the CA and LAA functionalities. The DCI engine 245 may be configured to generate and broadcast/transmit a DCI to the UE 105 to manage how the unlicensed spectrum is used. The DCI engine 245 may further include a plurality of sub-engines. Specifically, the DCI engine 245 may include a carrier off sub-engine 250, a carrier on sub-engine 255, a channel re-selection sub-engine 260, and a carrier BWP sub-engine 265. The carrier off sub-engine 250 may be configured to generate a carrier off DCI that indicates how the transceiver 120 of the UE 105 or portions thereof is deactivated for selected channels/bandwidths in the unlicensed spectrum. The carrier on sub-engine 255 may be configured to generate a carrier on DCI that indicates how the transceiver 120 of the UE 105 or portions thereof is activated for selected channels/bandwidths in the unlicensed spectrum. The channel re-selection sub-engine 260 may be configured to generate a channel re-selection DCI that synchronizes the UE 105 for channel hopping to defined channels/bandwidths in the unlicensed spectrum. The carrier BWP sub-engine 265 may be configured to generate a carrier BWP DCI that disables select sub-channels for the channel re-selection procedure.

The above noted engines each being an application (e.g., a program) executed by the processor 205 is only exemplary. The functionality associated with the engines may also be represented as a separate incorporated component of the eNB 130 or may be a modular component coupled to the eNB 130, e.g., an integrated circuit with or without firmware. For example, the integrated circuit may include input circuitry to receive signals and processing circuitry to process the signals and other information. In addition, in some eNBs, the functionality described for the processor 205 is split among a plurality of processors (e.g., a baseband processor, an applications processor, etc.). The exemplary embodiments may be implemented in any of these or other configurations of an eNB.

The memory 210 may be a hardware component configured to store data related to operations performed by the UE 105. The I/O device 220 may be a hardware component or ports that enable a user to interact with the eNB 130. The transceiver 225 may be a hardware component configured to exchange data with the UE 105 and any other UE in the system 100, particularly if the eNB 130 serves as a PCell or a SCell to the UE. The transceiver 225 may operate on a variety of different frequencies or channels (e.g., set of consecutive frequencies). When serving as the PCell, the transceiver 225 may operate on licensed channels/bandwidths to communicate with the corresponding UE. When serving as the SCell, the transceiver 225 may operate on licensed channels/bandwidths to communicate with the corresponding UE via a conventional CA functionality or unlicensed bandwidths to communicate with the corresponding UE via the LAA functionality. Therefore, the transceiver 225 may include one or more components (e.g., radios) to enable the data exchange with the various networks and UEs.

As described above, the eNB 130 may serve as the PCell for the UE 105. Thus, any management of channels/bandwidths used in the CA functionality (e.g., when only licensed channels are used) or in the LAA functionality (e.g., when an unlicensed bandwidth is used) may be performed by the eNB 130. According to the exemplary embodiments, the PCell may manage the LAA functionality by providing a DCI to the UE 105 that defines how the UE 105 is to perform operations related to the LAA functionality. As will be described in detail below, the DCI may be used in a variety of different ways including how to utilize the transceiver 120 and LAA operations.

Initially, the eNB 130 determines whether the CA functionality or the LAA functionality may be used with the UE 105. When the UE 105 has associated with the eNB 130 and joined the LTE network, the UE 105 may provide or has already provided information regarding capabilities. Those skilled in the art will understand that the UE 105 may have transmitted an indication as to whether the UE 105 is CA capable and whether the UE 105 is further LAA capable. Thus, the capability engine 235 may first process the indication to determine the types of data exchange pathways that are available for use with the UE 105. When the eNB 130 has determined that the UE 105 (or any number of UEs in the system 100) is LAA capable, the eNB 130 may utilize the further engines to manage how the unlicensed spectrum of the LAA functionality is used.

The SCell selection engine 240 may operate with the capability engine 235 to determine how SCells are selected and used in the CA and LAA functionalities. Since the eNB 130 is configured to determine how any CA operation is to be used by the UE 105, the SCell selection engine 240 may determine available SCells (e.g., the eNBs 135, 140) that are within range of the UE 105. For example, the UE 105 may have provided information regarding eNBs within a predetermined proximity or capable of communicating with the UE 105. The SCell selection engine 240 may also be configured to determine whether the available SCells of the UE 105 are LAA capable and/or have the LAA functionality activated. Accordingly, the SCell selection engine 240 may further be configured to request that an available SCell activate the LAA functionality.

The DCI engine 245 may generate and broadcast/transmit a DCI to the UE 105 to manage how the unlicensed spectrum is used. When the eNB 130 determines a universal modification to how the LAA functionality is to be used, the DCI may be broadcast to the UEs in the system 100 that are LAA capable. When the eNB 130 determines a specific modification for a particular UE, the DCI may be transmitted to the particular UE. Again, the DCI engine 245 may further include the carrier off sub-engine 250, the carrier on sub-engine 255, the channel re-selection sub-engine 260, and the carrier BWP sub-engine 265. Thus, the DCI engine 245 may generate a plurality of different DCIs via the engines 250-265. It is noted that the DCIs generated by the eNB 130 according to the exemplary embodiments may be modified versions of DCIs that are conventionally used with LTE networks.

The carrier off sub-engine 250 may generate a carrier off DCI that indicates how the transceiver 120 of the UE 105 or portions thereof may be deactivated for selected channels/bandwidths in the unlicensed spectrum. In determining how to generate the carrier off DCI, the carrier off sub-engine 250 may include a monitoring functionality. The monitoring functionality may be performed using a dedicated component and/or existing components. In a first example, the transceiver 225 of the eNB 130 may be configured to perform the monitoring functionality. For example, the monitoring functionality may be a module or incorporated component of the eNB 130. In a second example, the eNB 130 may include a traffic monitor configured with the monitoring functionality. The traffic monitor may be a modem configured with an always on mode providing medium occupation time and bandwidth to the eNB 130 via carrier sensing. As noted above, the LAA functionality may be for the 5 GHz WiFi spectrum. Thus, the traffic monitor may be a WiFi traffic monitor such as a companion WiFi device to the eNB 130.

Regardless of the implementation, the monitoring functionality may obtain occupation information associated with an occupation time and corresponding bandwidth for the unlicensed spectrum (e.g., the 5 GHz spectrum). Based on the medium occupation time and corresponding unlicensed bandwidth, the carrier off sub-engine 250 may determine a number of slots and/or subframes for which the unlicensed band may not be used to transmit data to the UE 105 via LAA. For example, the unlicensed bandwidth may be known to be in use at a future time for a certain duration (e.g., by a WiFi network and WiFi device). Accordingly, this may correspond to placing the LAA transceiver 120 of the UE 105 (or the appropriate portion of the LAA transceiver 120) in a sleep period at the specified unlicensed bandwidth during the known time/duration.

Determining the slots/subframes that the unlicensed bandwidth is unavailable may consider various factors. For example, the determination may consider the LBT mechanism and the timing of performing the LBT mechanism. In a particular manner, the LBT mechanism may be performed at a transmission time interval (TTI) boundary. The LBT mechanism may also use one TTI time before a valid cellular data transmission. Thus, the determination of the slots/subframes may also consider the LBT mechanism which may further indicate the availability of the unlicensed bandwidth. In another example, determining the slots/subframes may also consider an energy detection. In a substantially similar manner as the traffic monitor, an energy detection functionality (with corresponding component(s)) may be used to provide a further input in the slot/subframe determination. The energy detection output may serve as a gate factor to determine whether an off period is to be calculated and/or whether the carrier off DCI is to be broadcast. In a particular manner, if the energy detection output is below a predetermined threshold, the sleep period computation and carrier off DCI may be aborted (e.g., medium is marked as idle and may be used to transmit data).

The carrier off sub-engine 250 may therefore generate a carrier off DCI including the above determined information about when and for how long a selected unlicensed bandwidth is unavailable. The carrier off DCI may include a sleep period and unlicensed bandwidth information for the transceivers of LAA capable UEs in the system 100 for which the eNB 130 is the PCell. Thus, the eNB 130 may broadcast the carrier off DCI to these UEs (e.g., the UE 105). The broadcasting of the carrier off DCI may be performed over a licensed bandwidth or another available unlicensed bandwidth known to be used by the UEs. The result of the carrier off DCI being received by the UE 105 will be described in further detail below.

In an exemplary implementation, the carrier off DCI may include a plurality of different types of content and may be generated with various features. With regard to the content, the carrier off DCI may include a carrier indication or bandwidth field and a duration field. The bandwidth field may indicate the frequency and bandwidth occupied by on-going or expected transmissions. Depending on the entity at the cellular side (e.g., secondary carrier (SC) organization), the bandwidth field may be defined in different manners. In a first example, a range or list of SC indexes may be included. If a 802.11ac WiFi device is transmitting using 80 MHz and its primary channel is the same as a SC index 1 (SC1), while each SC is configured as 20 MHz (as in LTE), this bandwidth field may be a range to signify the SC index from 1 to 4. In a second example, a SC index and its associated BWPs may be included. If a 802.11ac WiFi device is transmitting using 80 MHz and its primary channel is within SC1 (which is configured as 100 MHz), the bandwidth field may include the SC1 and one or several BWPs to signify the location of the 80 MHz. In a third example, a combination of the SC index list and BWP list may be included. The duration field may indicate a certain time unit (e.g., in slots or subframes). The content may also be cyclic redundancy check (CRC) scrambled by a common radio network temporary identifier (RNTI) so that LAA capable UEs may be capable of decoding the carrier off DCI.

With regard to the features, in a first example, the carrier off DCI may be channel coded. For example, the carrier off DCI may be protected with channel coding (e.g., block code such as polar code, convolutional code, etc.). The channel code may be selected such that more reliability weight is placed on a false alarm rate rather than on a misdetection rate as the current status of the transceiver 120 is to be awake. If there is a false alarm, the receiver of the transceiver 120 may miss DL data by falsely entering into sleep mode. The UE 105 may also choose to fall back to an always wake-up mode under predetermined conditions (e.g., low signal to noise ratio (SNR)) to avoid false alarms. In another example, the carrier off DCI may include configurable monitoring. Thus, during a configuration or reconfiguration procedure, the definition of the DCI content may be signified or cleared. The configuration of the carrier off DCI may be piggybacked during the SCell configuration or reconfiguration. In a further example, the carrier off DCI may have monitoring that is activated or deactivated. The activation or deactivation of the carrier off DCI monitoring may be performed upon SCell activation or deactivation.

The carrier on sub-engine 255 may generate a carrier on DCI that indicates how the transceiver 120 of the UE 105 or portions thereof is activated for selected channels/bandwidths in the unlicensed spectrum. In determining how to generate the carrier on DCI, the carrier on sub-engine 255 may utilize the LBT mechanism. The eNB 130 may perform the LBT mechanism (e.g., at a slot or subframe boundary) if there is transmission data available at a DL buffer (e.g., for the UE 105). The LBT mechanism may be performed per sub-channel (e.g., 20 MHz per sub channel as in WiFi) and multiple LBT mechanisms may run in parallel to cover all available bandwidths. Accordingly, the eNB 130 may start the LBT mechanism simultaneously at each sub-channel.

Once select or all parts of bandwidths are sensed as idle, the carrier on sub-engine 255 may prepare to broadcast the carrier on DCI via an available bandwidth (e.g., licensed bandwidth or another available unlicensed bandwidth) at an earliest available time (e.g., next half slot time). The carrier on DCI may signify a wake-up event, may contain transmission durations if known, may contain available bandwidth information of the unlicensed spectrum, etc. At the same time, a reservation signal may be transmitted over available unlicensed bandwidths to prevent other eNBs or WiFi devices from occupying the medium. The reservation signal may be long enough to allow UEs to decode the carrier on DCI so that UEs may activate the corresponding receiver in the unlicensed bandwidth. Once the UE has decoded the carrier on DCI or the time expected for this operation to be completed has expired, the carrier on sub-engine 255 may stop the reservation signal and instruct that the cellular signal transmission over the reserved unlicensed bandwidth be initiated. The result of the carrier on DCI being received by the UE 105 will be described in further detail below.

The above describes the carrier on DCI that wakes up all LAA capable UEs at the indicated unlicensed bandwidth. However, this feature of waking all UEs is only exemplary. According to another exemplary embodiment, the carrier on DCI may be configured to be group specific such that only LAA capable UEs whose DL buffer contains transmission data at the side of the eNB 130 are placed awake.

In an exemplary implementation, the carrier on DCI may include a plurality of different types of content and may be generated with various features. With regard to the content, the carrier on DCI may include a carrier indication or bandwidth field and may also additionally include a transmission duration field. The bandwidth field may indicate the frequency and bandwidth reserved during performance of the LBT mechanism. Depending on the entity at the cellular side (e.g., SC organization), the bandwidth field may be defined in different manners. In a first example, a range or list of SC indexes may be included. If 80 MHz is sensed as idle and assuming that each SC is allocated 20 MHz, the frequency and bandwidth information may be signaled as $SC_n$ to $SC_{n+3}$. In a second example, a SC index and its associated BWPs may be included. If 80 MHz is sensed as idle and this bandwidth lies within a frequency region of SC1 (and assuming that SC1 is allocated 100 MHz and partitioned equally into 5 distinct BWPs), the frequency and bandwidth information may be signaled as $SC_1$, $BWP_n$-$BWP_{n+3}$. In a third example, a combination of the SC index list and BWP list may be included. The transmission duration field may indicate a certain time unit (e.g., in slots or subframes) as commonly agreed or signaled from a configuration procedure. The transmission duration field may be set to 0 to signal an unknown transmission duration. The content may also be CRC scrambled by a common RNTI so that all LAA capable UEs or ground UEs may be capable of decoding the carrier on DCI.

With regard to the features, in a first example, the carrier on DCI may be channel coded. For example, the carrier on DCI may be protected with channel coding (e.g., block code such as polar code, convolutional code, etc.). The channel code design may be selected such that more reliability weight is placed on a misdetection rate rather than on a false alarm rate as the current status of the transceiver 120 is to be asleep. If there is a misdetection, the receiver of the transceiver 120 may miss DL data by falsely staying in sleep mode. The UE 105 may also choose to fall back to an always wake-up mode under predetermined conditions (e.g., low signal to noise ratio (SNR)) to avoid misdetections. In another example, the carrier on DCI may have monitoring that is configurable. Thus, during a configuration or reconfiguration procedure, the definition of the DCI content may be specified or cleared. The configuration of the carrier on DCI may be piggybacked during the SCell configuration or reconfiguration with radio resource control (RRC) messages. In a further example, the carrier on DCI may have monitoring that is activated or deactivated. The activation or deactivation of the carrier on DCI monitoring may be automatically performed upon SCell activation or deactivation (depending on the configuration).

The channel re-selection sub-engine 260 may generate a channel re-selection DCI that synchronizes the UE 105 for channel hopping to defined channels/bandwidths in the unlicensed spectrum. As noted above, the selection of unlicensed bandwidths is a significant operation to improve the LAA functionality. For example, when the LAA functionality and a WiFi AP operate on the same unlicensed 5 GHz band, appropriate channel selection and/or re-selection is used for performance and coexistence. Also noted above, the selection operation may be carried out during normal small cell operation (e.g., after the initialization of the small cell) and may be based on periodical channel measurement and/or certain events (e.g., a WiFi AP joining the LAA channel).

In the 3GPP Release 13 including standards for LTE and LAA, no particular mechanism is specified for channel re-selection in the LAA functionality. With no specific mechanism in place, the channel re-selection trigger mechanism (when determined to be used) is a determination left to the eNB implementation. Furthermore, only the existing SCell reconfiguration or reactivation mechanism may be leveraged for the channel re-selection procedure. However, those skilled in the art will understand the drawbacks associated with such a reliance. For example, since the SCell reconfiguration is an RRC procedure, the latency (e.g., approximately 24 ms) becomes an issue. In another example, since the SCell reconfiguration or reactivation is UE specific, such a procedure may have to be repeated for each UE in the system (as such a channel reselection is triggered by the eNB 130 instead of the UE).

In view of the above, the channel re-selection mechanism according to the exemplary embodiments utilizes a trigger mechanism which is analogous to a cell measurement or a cell re-selection mechanism used in LTE. However, the trigger mechanism according to the exemplary embodiments is channel or carrier specific (not UE specific) and measurement may mainly be done at the eNB 130 (rather than at the UE). Thus, a fast channel re-selection mechanism may be provided based on carrier-wide messages (e.g., channel re-selection DCI). Such an approach provides various advantages. For example, this approach is low cost as it uses a carrier-wide broadcast instead of a UE specific one. In another example, this approach has low latency as it is carrier-wide and may be done at the PHY level via DCI. In a further example, in view of the two advantages noted above, this approach fits for fast channel adaptation.

The channel re-selection trigger according to the exemplary embodiments may involve the channel re-selection sub-engine 260 monitoring a load condition and arbitrating a channel re-selection. The load condition monitoring may also be analogous to cell measurement in LTE but done at the eNB 130. The load condition monitoring may relate to two different measurements: a serving channel load measurement and a neighbor channel load measurement. The serving channel load measurement may be the load on the SCC provided by the SCell (e.g., eNB 135 or eNB 140) to a UE for which the eNB 130 is the PCell. The load introduced by the serving LAA SCell for the UEs in the system 100 (e.g., the UE 105) may be excluded from consideration to have a fair comparison with the neighbor channel load. For example, the serving channel load measurement may relate to how other sources (e.g., WiFi devices) introduce load to the serving channel. The serving channel load measurement may be derived as a side product of the LBT mechanism (e.g., if the LBT mechanism is performed continuously when LAA does not occupy the channel). The neighbor channel load measurement may be the load on a channel not in use for UEs for which the eNB 130 is the PCell. Depending on an associated cost (e.g., service interruption time, power consumption, etc.), the neighbor channel load measurement may be triggered by predetermined events (e.g., serving channel load is above a threshold). The measurement method options for the neighbor channel load measurement may be a parallel measurement (e.g., DL transmission and channel monitoring in parallel) or a serial measurement (e.g., DL transmission and channel monitoring in serial such as a measurement gap).

The measurement results for the serving channel load measurement and the neighbor channel load measurement may be filtered (e.g., L3 filter as in LTE) before being used as an input for channel re-selection.

The channel re-selection arbitration may have an objective of increasing an available channel capacity for the LAA functionality. Thus, several factors or a combination thereof may be taken into consideration. For example, the factors may include the load condition (e.g., at the serving channel, at the neighbor channel, or both), a dynamic frequency selection (DFS) or transmit power control (TPC) requirement, a transmit power spectrum density (PSD), an available bandwidth etc. To avoid a ping-pong channel re-selection, the channel re-selection arbitration performed by the channel re-selection sub-engine 260 may utilize a hysteresis. For example, a serving channel load condition may be a predetermined percentage worse than a neighbor channel load condition before re-selection is considered. Thus, the channel re-selection arbitration mechanism may involve measuring the serving channel load and determining if the load by other sources is above a threshold (since the load from itself is omitted). When the load by the other sources is above the threshold, the channel re-selection arbitration mechanism may involve measuring the neighbor channel load and determining if a less loaded neighboring channel is available. When such a neighbor channel exists, the channel re-selection arbitration may trigger a channel re-selection by broadcasting the channel re-selection DCI.

In contrast to providing instructions as to whether the transceiver 120 of the UE 105 or portions thereof are to be placed asleep or awake, the channel re-selection mechanism through the channel re-selection DCI may be a bidirectional process including an exchange of information between the UE 105 and the eNB 130 to schedule data transmissions. Thus, the eNB 130 may first broadcast the channel re-selection DCI. The channel re-selection DCI may be broadcast over any available bandwidth (e.g., licensed or unlicensed). For example, the channel re-selection DCI may be broadcast over the licensed bandwidth by stopping the LBT mechanism until the broadcast has completed. In another example, the LBT mechanism may continue to operate on all possible serving unlicensed bandwidths and the channel re-selection DCI may be broadcast once one of these unlicensed bandwidths becomes available. The channel re-selection DCI may be broadcast at the PHY level via carrier DCI for fast interaction. However, the channel re-selection DCI may also be broadcast at the MAC level or the RRC level. The channel re-selection DCI may also include information about the new channel (e.g., channel number and bandwidth) to which the re-selection has been determined (e.g., based on the above described arbitration process).

The result of the channel re-selection DCI being received by the UE 105 will be described in further detail below. However, upon the UE 105 receiving the channel re-selection DCI, the eNB 130 may receive a response. For example, an ACK may be received explicitly (e.g., an ACK from the UE 105) or implicitly from the UE 105 (e.g., hinted by other responses from the UEs such as a CSI feedback report from UEs regarding re-selected channels) that received the channel re-selection DCI. The ACK may indicate that the UE 105 is prepared for the new unlicensed bandwidth.

The eNB 130 may perform further operations prior to scheduling data over the new unlicensed bandwidth that was re-selected for the UE 105. For example, to perform link adaptation of a new selected unlicensed bandwidth, the eNB 130 may utilize a UE specific CSI feedback. The eNB 130 may also broadcast an un-precoded CSI-RS to all UEs to facilitate a fast acquisition of link quality for these UEs. However, the eNB 130 may also skip this CSI feedback operation if a conservative scheduling is used. Once the re-selection has been instructed and confirmed, the eNB 130 may start the LBT mechanism and perform data communications (e.g., in the DL) over the re-selected unlicensed bandwidth.

The carrier BWP sub-engine 265 may generate a carrier BWP DCI that disables select sub-channels for the channel re-selection procedure. Those skilled in the art will understand that a bandwidth may include components such as BWPs which are composed of continuous sub-components such as physical resource blocks (PRBs). For New Radio (NR) LAA, the NR may bond several 20 MHz sub-channels together as one channel or into one SCell. With each channel or small cell, several BWPs may be configured in a UE specific, UE group, or channel specific manner. The carrier BWP sub-engine 265 may generate the carrier BWP DCI when there is no better channel available for re-selection (as may be determined by the channel re-selection sub-engine 260) and when one or more 20 MHz sub-channels are too congested or have too many collisions. Specifically, the carrier BWP DCI may be generated by the carrier BWP sub-engine 265 to disable these sub-channels. The carrier BWP DCI may include a bit mask regarding status (e.g., activated or deactivated) for each sub-channel. The carrier BWP DCI may also be broadcast over common unlicensed bandwidth management CORESET. The result of the carrier BWP DCI being received by the UE 105 will be described in further detail below. If an effective BWP is zero or too small for certain UEs, the carrier BWP sub-engine 265 may reconfigure these UEs with normal UE specific BWPs and activate them accordingly.

The above describes a plurality of different DCIs that the eNB 130 may be configured to generate and broadcast to the UEs. The eNB 130 may be configured to generate and utilize one or more of the above described DCIs. For example, the eNB 130 may be configured to only utilize the carrier off DCI, to utilize the carrier off DCI and the channel re-selection DCI, to utilize all four DCIs, etc. Furthermore, the eNB 130 may also utilize a combination of the DCIs for broadcast or may utilize the DCIs exclusively. For example, the carrier off DCI and the carrier on DCI may provide opposite effects on the UEs and given opposing current statuses that may be used (e.g., a current status being awake for UEs using the carrier off DCI while a current status being asleep for UEs using the carrier on DCI). Thus, the carrier off DCI and the carrier on DCI may be utilized mutually exclusive from one another. However, when the eNBs and/or the UEs are properly configured, a combination of the carrier off DCI and the carrier on DCI may be utilized. In another example, the channel re-selection DCI and the carrier BWP DCI may be used separately from one another. As the carrier BWP DCI may have a setting to be used on a condition when a channel re-selection is not possible or viable (e.g., when the channel re-selection DCI would be used), the carrier BWP DCI may be used only when the channel re-selection DCI is not used. In a further example, the channel off DCI and/or the channel on DCI may be used in combination with the channel re-selection DCI and/or the carrier BWP DCI. For example, the channel re-selection DCI and the carrier BWP DCI may be a further refinement as to how the carrier off DCI and the carrier on DCI are to affect the UEs.

The above describes the operations performed by the PCell (e.g., the eNB 130) in managing the unlicensed spectrum, although as noted above, may also be performed by the SCell (e.g., when the DCI is broadcast over an available unlicensed band). When any one or more of the DCIs are provided to the UE 105, the unlicensed spectrum for the LAA functionality may be used in a more efficient manner as the PCell may have selected SCells, defined how the LAA functionality is to be used, and defined unlicensed bandwidths to be used based on available information of the unlicensed spectrum. Accordingly, a proactive approach is used by the PCell to decrease or eliminate a need for the UE 105 to provide feedback for the selected manner of using the LAA functionality (e.g., SCells, bandwidths, etc.). However, the exemplary embodiments may be used in addition to the conventional approach of the UE 105 providing feedback to the PCell to further refine how the LAA functionality is used.

When the DCI has been received by the UE 105 via a transmission or broadcast, the UE 105 may also perform a plurality of operations based on information included in the received DCI. In a first example, when the UE 105 receives the carrier off DCI, the UE 105 may initially decode the carrier off DCI. As described above, the carrier off DCI may define unlicensed bandwidths and corresponding sleep periods. Accordingly, a receiver sleep scheme may be performed by the UE 105 that places the receiver portion of the transceiver 120 corresponding to the unlicensed bandwidths to sleep during the denoted sleep periods or times that these unlicensed bandwidths are unavailable. The sleep state is only exemplary and any low power mode may be used during these denoted time periods. When the respective time periods have expired, the UE 105 may wake up the receivers and prepare for an ensuing DL data.

In a second example, when the UE 105 receives the carrier on DCI that is broadcast from the eNB 130, the UE 105 may initially decode the carrier on DCI. As described above, the carrier on DCI may define unlicensed bandwidths that have been reserved for use by the UE 105 and are to be used for a DL transmission. Accordingly, the UE 105 may perform a receiver wake scheme to activate receiver chains for these reserved unlicensed bandwidths to start reception. Once the DL transmissions have been completed or a time duration has been specified to wake a particular receiver chain, the UE 105 may place these receivers to sleep. Otherwise, the UE 105 may place these receivers to sleep after a non-cellular signal is detected or a maximum predetermined allowed transmission duration has lapsed (which may be signaled from an upper layer via a static or semi-static RRC configuration).

In a third example, when the UE 105 receives the channel re-selection DCI that is broadcast from the eNB 130, the UE 105 may initially decode the channel re-selection DCI. As described above, the channel re-selection DCI may be used to synchronize a channel hopping scheme of the UE 105 when a new channel is to be used. Thus, the channel re-selection DCI may define the new unlicensed bandwidth that may be used for subsequent DL transmissions via the LAA functionality. When the channel re-selection DCI has been decoded and further processing has been performed to determine whether the UE 105 is prepared for this change via a channel re-selection scheme, the UE 105 may generate and transmit an ACK or provide an implicit ACK regarding its readiness. Subsequently, when a DL transmission is being exchanged, the UE 105 may use this new unlicensed bandwidth.

In a fourth example, when the UE 105 receives the carrier BWP DCI that is broadcast from the eNB 130, the UE 105 may initially decode the carrier BWP DCI. As described above, the carrier BWP DCI may define BWPs that are activated or deactivated via a bit mask indicating status of the channel specific BWPs. The UE may use the channel specific BWPs as an AND mask for previously configured UE specific BWPs to adjust a modified effective operating BWP configuration. In this manner, the UE may be aware of the BWPs that may be used or omitted from consideration in using unlicensed bandwidths in the LAA functionality.

The UE 105 may also be configured to utilize one or more of the DCIs. For example, the UE 105 may be configured to only utilize the carrier off DCI or the carrier on DCI. In another example, the UE 105 may be configured to utilize the carrier off DCI and the channel re-selection DCI. In a further example, the UE 105 may be configured to utilize all four DCIs. In this manner, the UE 105 may be configured to decode and extract the information that may be included in the DCI to perform subsequent operations. Furthermore, the UE 105 may also be configured to utilize a combination of the DCIs when more than one type of DCI is received from a broadcast by the eNB 130. For example, the UE 105 may have received the carrier off DCI and the channel re-selection DCI. The UE 105 may therefore place the receiver chains for the defined unlicensed bandwidths to sleep and further determine the unlicensed bandwidth that is to be selected for use in the LAA functionality.

Figure 3:
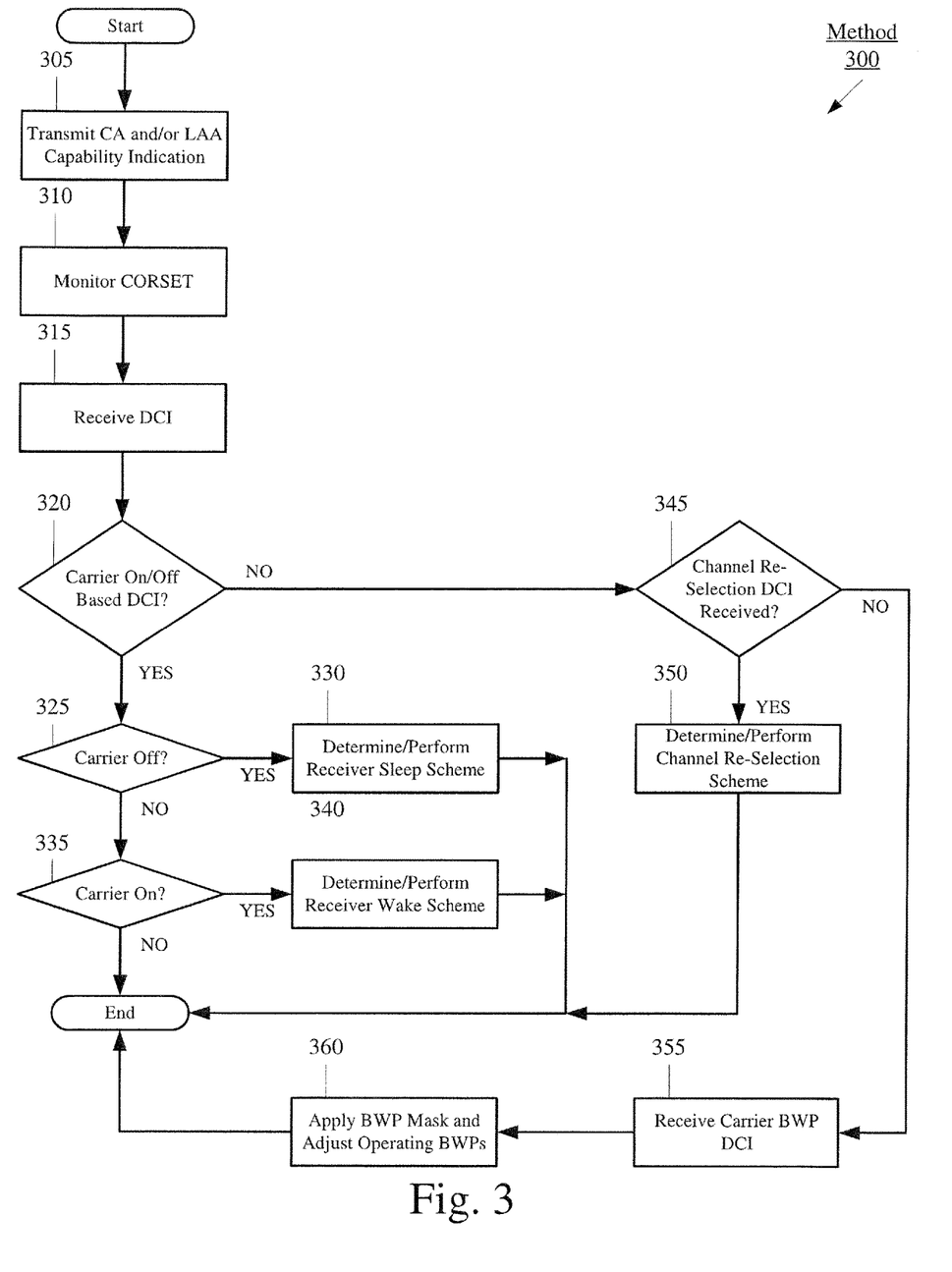
FIG. 3 shows an example method for managing use of unlicensed bandwidths by a user equipment according to various exemplary embodiments described herein.

FIG. 3 shows an example method 300 for managing use of unlicensed bandwidths by a user equipment according to various exemplary embodiments described herein. The method 300 may relate to how the UE 105 receives one or more DCIs being broadcast from the PCell (e.g., eNB 130) and performs a corresponding set of operations based on information extracted from the DCI. Thus, the method 300 will be described from the perspective of the UE 105.

In 305, the UE 105 may have associated with the eNB 130. During the association procedure or at a time thereafter, the UE 105 may transmit capability information to the eNB 130. The capability information may include a CA capability and/or a LAA capability. When the CA or LAA capability is acknowledged by the eNB 130, the eNB 130 may become the PCell for the UE 105 and provide the PCC with other SCells (e.g., eNBs 135, 140) being used to provide SCCs when available.

In 310, the UE 105 monitors the CORESET broadcast by the eNB 130. As described above, the CORESET may be control information including a dedicated control resource set that is provided over the licensed band of the PCell or over an available unlicensed band relative to the PCell. The CORESET may include one of the DCIs described above. When the eNB 130 has determined that a DCI is to be broadcast, in 315, the UE 105 may receive the DCI through the monitoring of the CORESET.

In 320, the UE 105 determines whether the DCI is a carrier on or carrier off based DCI. The carrier on or carrier off based DCI may relate to whether receiver chains are to be placed asleep or awake. If the DCI is a carrier on or a carrier off based DCI, the method continues to 325 where the UE 105 determines if the DCI is the carrier off DCI. If the carrier off DCI is received, the method continues to 330 where the UE 105 decodes the carrier off DCI and determines and performs the receiver sleep scheme. The UE 105 may determine the receiver chains associated with the denoted unlicensed bandwidth(s) as well as the corresponding duration the denoted unlicensed bandwidth(s) is unavailable. The UE 105 may use this information to place these receiver chains to sleep. If the DCI is not the carrier off DCI, the method continues to 335 where the UE 105 determines if the DCI is a carrier on DCI. If the carrier on DCI is received, the method continues to 340 where the UE 105 decodes the carrier on DCI and determines and performs the receiver wake scheme. The UE 105 may determine the receiver chains associated with the denoted unlicensed bandwidth(s) and any corresponding duration the denoted unlicensed bandwidth(s) is to be used. Thus, the UE 105 may use this information to wake these receiver chains.

Returning to 320, if the DCI is not a carrier on or a carrier off based DCI, the method continues to 345 where the UE 105 determines whether the DCI is related to channel selection/re-selection. If the channel re-selection DCI is received, the UE 105 decodes the channel re-selection DCI and continues to 350 where the channel re-selection scheme is determined and performed. The UE 105 may determine the new unlicensed bandwidth that was selected for use in the LAA functionality and a receiver chain is tuned to this unlicensed bandwidth for an incoming DL transmission. As noted above, the UE 105 may also exchange acknowledgement information with the eNB 130 during the channel re-selection scheme. If the DCI is not the channel re-selection DCI, the method continues to 355 where the carrier BWP DCI is determined to be received. In 360, the UE 105 decodes the carrier BWP DCI and applies the BWP mask defined therein to adjust the operating BWPs.

Figure 4:
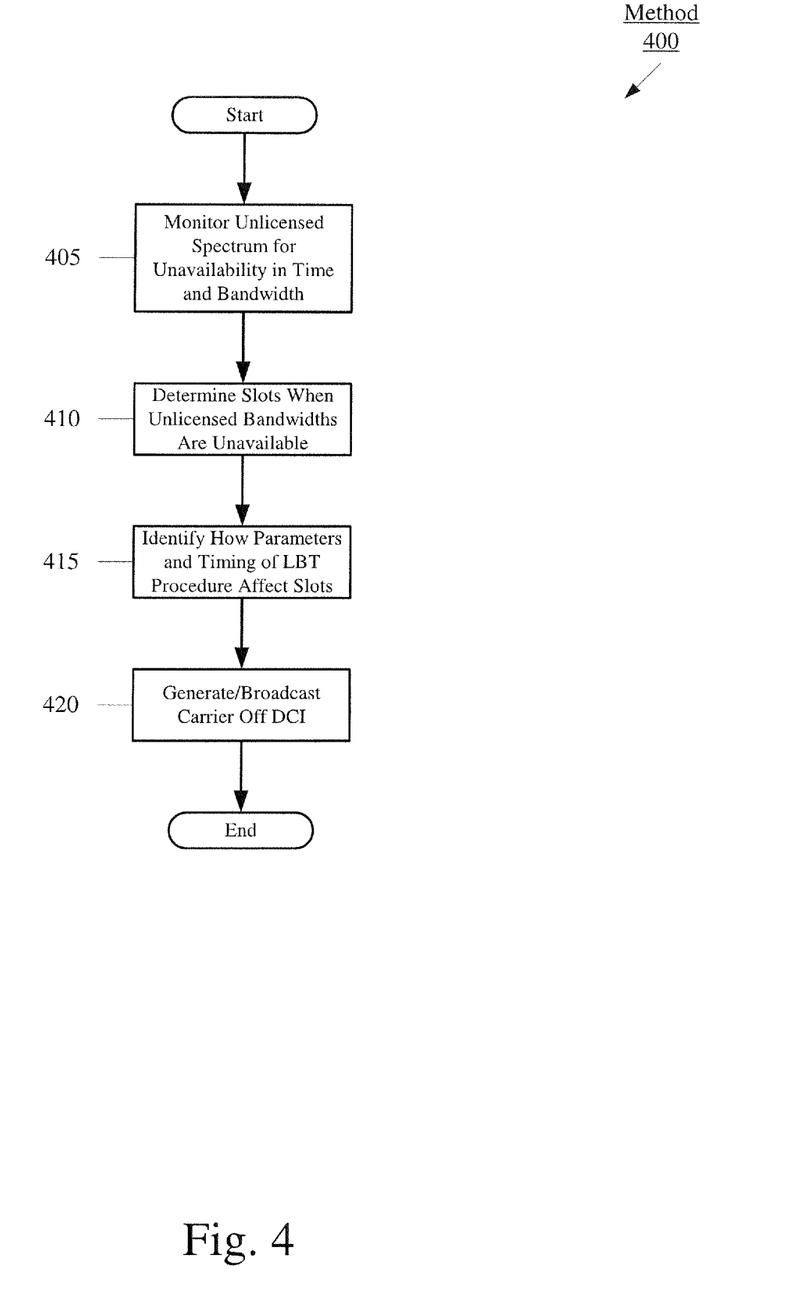
FIG. 4 shows a first example method for managing use of unlicensed bandwidths by a primary serving cell through radio control on a user equipment according to various exemplary embodiments described herein.

FIG. 4 shows a first example method 400 for managing use of unlicensed bandwidths by a primary serving cell through radio control on a user equipment according to various exemplary embodiments described herein. The method 400 may relate to how the eNB 130 generates and broadcasts the channel off DCI to UEs for which the eNB 130 is the PCell. Thus, the method 400 will be described from the perspective of the eNB 130.

In 405, the eNB 130 monitors the traffic in the bandwidths of the unlicensed spectrum to determine when unlicensed bandwidths will be unavailable for a corresponding duration of time. As described above, the eNB 130 may include a traffic monitoring component (e.g., incorporated therein, modularly incorporated, attached, etc.) or may receive traffic monitoring information from a separate component. The traffic monitoring information may identify unlicensed bandwidths that are in use or expected to be used for known durations of time. Thus, in 410, the eNB 130 may determine slots or subframes when the unlicensed bandwidths are unavailable. The eNB 130 may incorporate parameters associated with the LBT procedure. Thus, in 415, the eNB 130 incorporates these features to refine the unlicensed bandwidths that are unavailable and their corresponding durations of time. In 420, the eNB 130 broadcasts the carrier off DCI. The carrier off DCI may be broadcast over a bandwidth of the licensed spectrum or another available unlicensed bandwidth.

Figure 5:
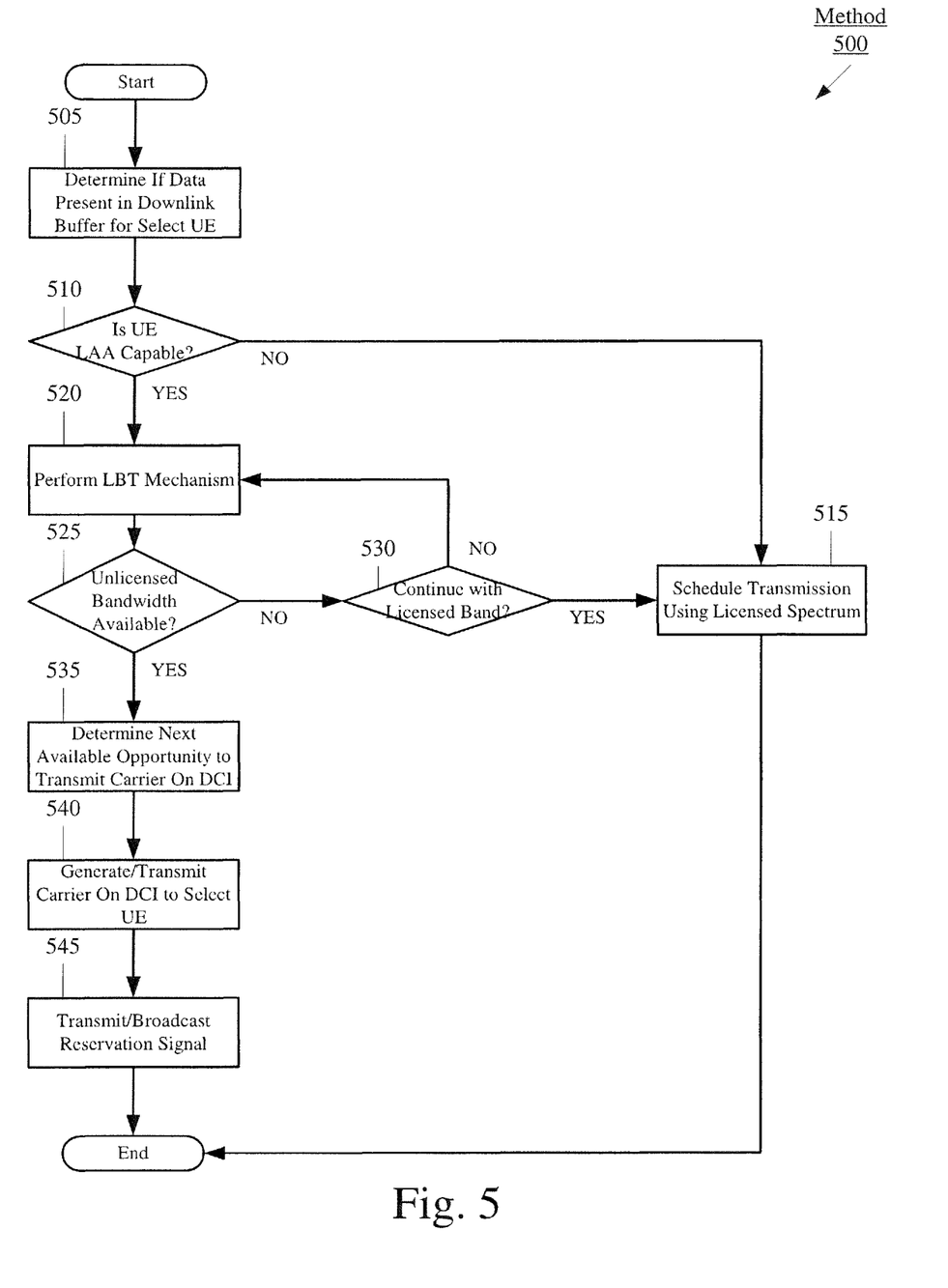
FIG. 5 shows a second example method for managing use of unlicensed bandwidths by a primary serving cell through radio control on a user equipment according to various exemplary embodiments described herein.

FIG. 5 shows a second example method 500 for managing use of unlicensed bandwidths by a primary serving cell through radio control on a user equipment according to various exemplary embodiments described herein. The method 500 may relate to how the eNB 130 generates and broadcasts the channel on DCI to UEs for which the eNB 130 is the PCell. Thus, the method 500 will be described from the perspective of the eNB 130.

In 505, the eNB 130 determines if data is present in a DL buffer for the UE 105 or any other UE in the system 100 (e.g., for which the eNB 130 is the PCell). When data is present in the DL buffer, in 510, the eNB 130 determines if the UE for which the data is bound is LAA capable. If the UE is not LAA capable, the eNB 130 continues to 515 where the transmission is scheduled using one or more bandwidths in the licensed spectrum.

If the UE is LAA capable, the eNB 130 continues to 520 where the LBT mechanism is performed. As described above, the LBT mechanism may involve sensing a radio environment prior to initiating a transmission such that a determination may be made as to an unlicensed bandwidth over which a data exchange may be performed in the LAA functionality. Thus, the eNB 130 may use the LBT mechanism to determine when an unlicensed bandwidth is not in use or overloaded. If an unlicensed bandwidth is not available in 525, the method continues to 530 where the eNB 130 determines whether the DL transmission is to continue with the licensed spectrum. If the unlicensed spectrum is to be used, the method returns to 520. However, if the DL transmission may be performed using only licensed bandwidths, the method continues to 515 where the eNB 130 schedules the DL transmission using the licensed spectrum.

Returning to 525, if an unlicensed bandwidth is available, the method continues to 535 where the eNB 130 determines a next available opportunity to broadcast the carrier on DCI (which defines the available unlicensed bandwidth to be used). As described above, the carrier on DCI may also include a duration that the unlicensed bandwidth is to be used if this information is known. In 540, the eNB 130 generates and transmits the carrier on DCI to the UE 105. In 545, at the same time, the eNB 130 may also transmit or broadcast a reservation signal so that the bandwidth in the unlicensed spectrum is reserved for use in the LAA functionality to transmit the DL data in the DL buffer to the UE 105.

Figure 6:
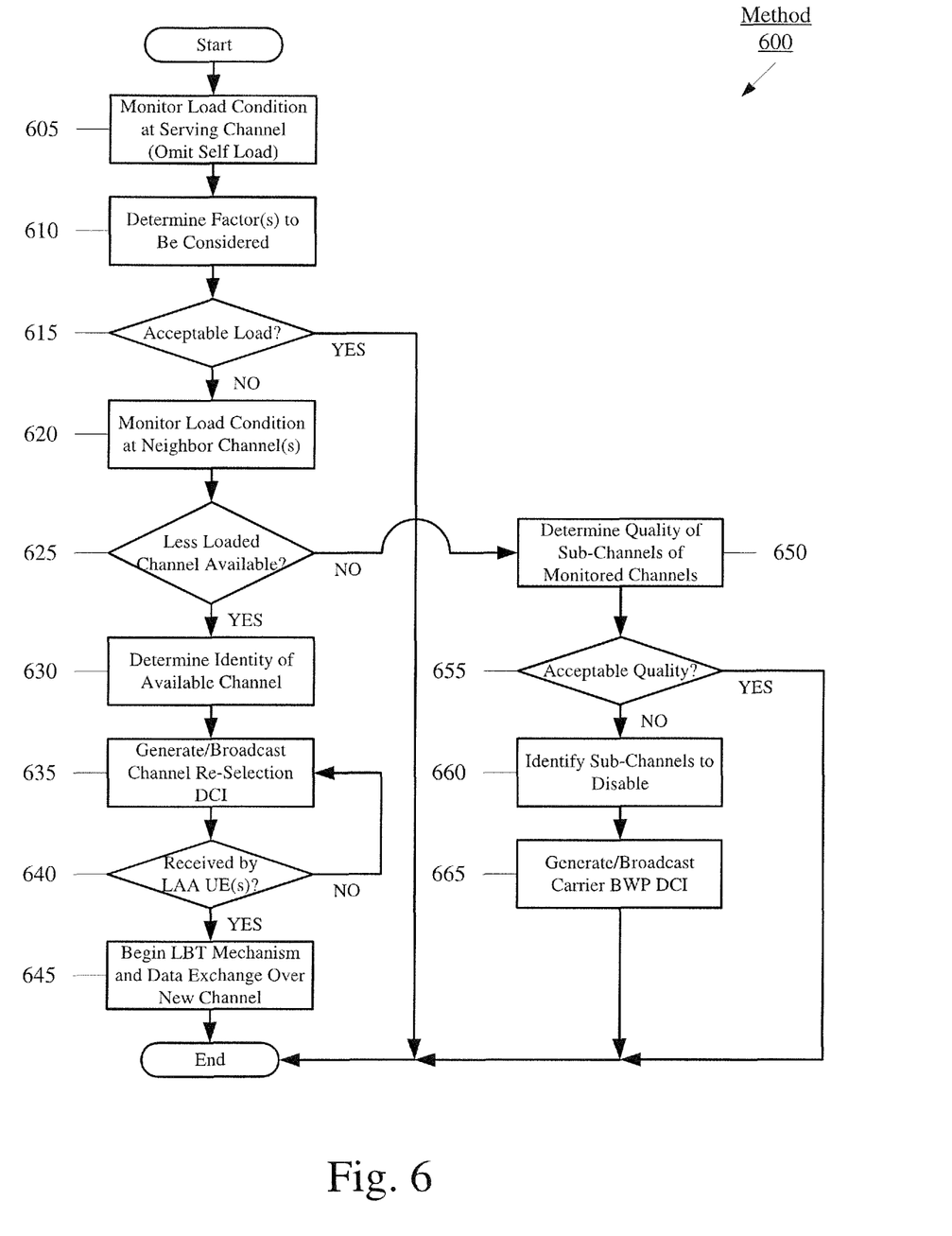
FIG. 6 shows an example method for managing use of unlicensed bandwidths by a primary serving cell through channel control according to various exemplary embodiments described herein.

FIG. 6 shows an example method 600 for managing use of unlicensed bandwidths by a primary serving cell through channel control according to various exemplary embodiments described herein. The method 600 may relate to how the eNB 130 generates and broadcasts the channel re-selection DCI or the carrier BWP DCI to UEs for which the eNB 130 is the PCell. Thus, the method 600 will be described from the perspective of the eNB 130.

In 605, the eNB 130 monitors a load condition at the serving channel. The load of the serving channel may relate to how other sources of load are using the serving channel that is currently selected for the LAA functionality for the UE 105. As noted above, the load from the serving LAA cell may be omitted to provide a fair comparison since this load is not included in the neighbor channel load measurement. In 610, the eNB 130 determines the factors to be considered to increase the available channel capacity for LAA which may persist for the remainder of the method 600. For example, the factors may include the load condition, the DFS or TPC requirement, the transmit PSD, the available bandwidth of the unlicensed spectrum, etc.

In 615, the eNB 130 determines whether the serving channel has an acceptable load. If the unlicensed channel has an acceptable load for the additional load associated with the UE 105 to further be included, the eNB 130 continues use of this selected unlicensed bandwidth. However, if the unlicensed channel has a load that exceeds a predetermined threshold, the method continues to 620. In 620, the eNB 130 monitors a load condition at one or more neighbor channels. In 625, the eNB 130 determines if one of the neighbor channels has a lower loading condition that may be used in lieu of the serving channel. The method 600 may include a hystersis operation to avoid a ping-pong condition such that the serving channel load condition is at least a predetermined amount worse than a neighboring channel load condition.

If a neighbor channel is identified to have a lower loading condition (e.g., such that the serving channel is at least the predetermined amount worse), the method continues to 630. In 630, the eNB 130 determines the identity of this unlicensed channel. IN 635, the eNB 130 generates and broadcasts the channel re-selection DCI including the identity of this unlicensed channel. In 640, a determination is made whether the channel re-selection DCI has been received by the UE 105. If not received, the method returns to 640 where the eNB 130 continues broadcasting the channel re-selection DCI. If the eNB 130 receives an ACK from the UE 105, the eNB 130 may be aware that the UE 105 is prepared to use the re-selected unlicensed bandwidth so that in 645, the eNB 130 begins the LBT mechanism at this unlicensed bandwidth and performs data exchanges over this unlicensed bandwidth.

Returning to 625, if the serving channel has an unacceptable load and no neighbor channel is determined to be acceptable for a re-selection, the method continues to 650. In 650, the eNB 130 determines a quality of the sub-channels of the monitored channels of the unlicensed spectrum. For example, the quality may relate to whether the sub-channels are too congested or have too many collisions. In 655, the eNB 130 determines whether the sub-channels have an acceptable quality (e.g., low congestion/collisions). If sub-channels are determined to have an acceptable quality (and assuming these sub-channels have already been identified as an operating BWP), the eNB 130 may continue use of these sub-channels. However, if the sub-channels are determined to have an unacceptable quality, the method continues to 660 where the eNB 130 identifies these sub-channels to be disabled and in 665, the eNB 130 generates and broadcasts the carrier BWP DCI that provides an AND mask to be applied to disable the denoted BWPs.

FIGS. 4-6 describe methods associated with the eNB 130 being the PCell and providing control information including DCIs according to the exemplary embodiments to the UE 105. Although the methods of FIGS. 4-6 are described in an individual manner, the eNB 130 may include an overall method to select one or more of the DCIs to be generated and broadcast to the UE 105. For example, the eNB 130 may determine if a combination of the DCIs is to be used. In another example, the eNB 130 may determine a priority between the carrier off current status (wake up) and the carrier on current status (sleep). Thus, if the awake current status takes precedence, the carrier off DCI may be used and vice versa. The eNB 130 may be configured to utilize any criteria to determine which one or more of the DCIs are to be used.

The exemplary embodiments provide a device, system, and method of managing use of the unlicensed spectrum in the LAA functionality through a proactive approach performed by the PCell of the LAA functionality. With no defined mechanism in place by the LTE standards for the LAA functionality and selecting/re-selecting the appropriate channel, the exemplary embodiments provide a plurality of dedicated CORESET information blocks that are broadcast to UEs to define how the unlicensed spectrum is to be managed. Specifically, the exemplary embodiments include a carrier off DCI that defines unlicensed bandwidths that are unavailable such that corresponding receiver chains of the UE may be put to sleep, a carrier on DCI that defines an unlicensed bandwidth that is to be used such that a corresponding receiver chain of the is placed awake, a channel re-selection DCI that synchronizes a channel hopping scheme so that a denoted unlicensed bandwidth is re-selected for the LAA functionality, and a carrier BWP DCI that defines sub-channels or BWPs that are to be omitted from consideration in the LAA functionality.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at an evolved Node B (eNB) serving as a primary serving cell (PCell) providing a primary component carrier (PCC) in a licensed spectrum to a user equipment (UE) in a carrier aggregation (CA) scheme, wherein a secondary component carrier (SCC) is provided in an unlicensed spectrum:
   monitoring parameters of bandwidths in the unlicensed spectrum;
   when at least one of the parameters indicates a change in availability of a select one of the bandwidths, generating a control indicator including a downlink control information (DCI) defining the change in availability of the bandwidth, the DCI being a carrier bandwidth part (BWP) DCI defining sub-channels to be omitted from consideration of being used;
   wherein the at least one parameter comprises a quality level of the sub-channels, the quality level being associated with one of a congestion level, a collision level, or a combination thereof; and
   broadcasting the control indicator to the UE,
   wherein the control indicator affects a modification in a transceiver of the UE associated with the bandwidth.

2. The method of claim 1, wherein the control indicator is a part of a dedicated control resource set.

3. The method of claim 2, wherein the dedicated control resource set includes a carrier off DCI defining when the bandwidth is unavailable, wherein the at least one parameter further comprises an occupation time of the bandwidth.

4. The method of claim 3, wherein the carrier off DCI defines the occupation time as a number of one of slots or subframes that the bandwidth is unavailable.

5. The method of claim 3, wherein the carrier off DCI affects a modification in the transceiver comprising a receiver chain of the transceiver for the bandwidth being placed into a low power mode.

6. The method of claim 2, wherein the dedicated control resource set includes a carrier on DCI defining when the bandwidth is available to be used, wherein the at least one parameter comprises part of a listen before talk (LBT) mechanism which indicates when the bandwidth or a portion thereof is idle.

7. The method of claim 6, wherein the carrier on DCI defines a duration that the bandwidth is to be used.

8. The method of claim 6, wherein the carrier on DCI affects a modification in the transceiver comprising a receiver chain of the transceiver for the bandwidth being placed into a wake mode.

9. The method of claim 6, further comprising:
   broadcasting a reservation signal for the bandwidth.

10. The method of claim 2, wherein the dedicated control resource set includes a channel re-selection DCI defining a change from the bandwidth to a further bandwidth, wherein the at least one parameter further comprises a load condition of the bandwidth and a load condition of the further bandwidth.

11. The method of claim 10, wherein the channel re-selection DCI affects a modification in the transceiver comprising a change from a first receiver chain of the transceiver associated with the bandwidth to a second receiver chain of the transceiver associated with the further bandwidth.

12. The method of claim 10, further comprising:
    receiving an acknowledgement from the UE indicating receipt of the channel re-selection DCI;
    activating an LBT mechanism at the further bandwidth.

13. The method of claim 1, wherein the carrier BWP DCI comprises an AND mask for the sub-channels to adjust a previously defined set of operating BWPs.

14. A network component, comprising:
    a transceiver configured to connect to a user equipment (UE), the transceiver configured with a carrier aggregation (CA) functionality and serving as a primary serving cell (PCell) providing a primary component carrier (PCC) to the UE, wherein a secondary component carrier (SCC) is provided in an unlicensed spectrum; and
    a processor monitoring parameters of bandwidths in the unlicensed spectrum, when at least one of the parameters indicates a change in availability of a select one of the bandwidths, the processor generating a control indicator including a downlink control information (DCI) defining the change in availability of the bandwidth, the DCI being a carrier bandwidth part (BWP) DCI defining sub-channels to be omitted from consideration of being used, wherein the at least one parameter comprises a quality level of the sub-channels, the quality level being associated with one of a congestion level, a collision level, or a combination thereof,
    wherein the processor instructs the transceiver to broadcast the control indicator to the UE,
    wherein the control indicator affects a modification in a transceiver of the UE associated with the bandwidth.

15. The network component of claim 14, wherein the control indicator is a part of a dedicated control resource set.

16. The network component of claim 15, wherein the dedicated control resource set comprises one of a carrier off DCI defining when the bandwidth is unavailable, a carrier on DCI defining when the bandwidth is available to be used, or a channel re-selection DCI defining a change from the bandwidth to a further.

17. The network component of claim 16, wherein, when the dedicated control resource set comprises the carrier off DCI, the modification comprises a receiver chain of the transceiver for the bandwidth being placed into a low power mode, when the dedicated control resource set comprises the carrier on DCI, the modification comprises the receiver chain of the transceiver for the bandwidth being placed into a wake mode, and when the dedicated control resource set comprises the channel re-selection DCI, the modification comprises a change from a first receiver chain of the transceiver associated with the bandwidth to a second receiver chain of the transceiver associated with the further bandwidth.

18. The network component of claim 14, wherein the carrier BWP DCI comprises an AND mask for the sub-channels to adjust a previously defined set of operating BWPs.

19. A method, comprising:

at a user equipment (UE) configured with a carrier aggregation (CA) functionality and a licensed assisted access (LAA) functionality wherein a primary component carrier (PCC) is served in a licensed spectrum and a secondary component carrier (SCC) is served in an unlicensed spectrum, the UE being provided control information to use the LAA functionality by a primary serving cell (PCell) providing the PCC:

receiving a control indicator being broadcast from the PCell, the control indicator including a downlink control information (DCI) defining a change in an availability of a bandwidth in the unlicensed spectrum, the DCI being a carrier bandwidth part (BWP) DCI defining sub-channels to be omitted from consideration of being used, wherein the at least one parameter comprises a quality level of the sub-channels, the quality level being associated with one of a congestion level, a collision level, or a combination thereof;

determining a modification to a transceiver of the UE associated with the bandwidth; and implementing the modification.

20. The method of claim 19, wherein the control indicator is a part of a dedicated control resource set that includes a carrier off DCI defining when the bandwidth is unavailable, wherein the at least one parameter further comprises an occupation time of the bandwidth.

* * * * *